US012386705B2

(12) United States Patent
Pulickal Aravindakshan

(10) Patent No.: US 12,386,705 B2
(45) Date of Patent: Aug. 12, 2025

(54) SYSTEM AND METHODS FOR COMPUTING PARITY INFORMATION IN A RAID ARRAY

(71) Applicant: Microchip Technology Incorporated, Chandler, AZ (US)

(72) Inventor: Anoop Pulickal Aravindakshan, Karnataka (IN)

(73) Assignee: Microchip Technology Incorporated, Chandler, AZ (US)

( * ) Notice: Subject to any disclaimer, the term of this patent is extended or adjusted under 35 U.S.C. 154(b) by 7 days.

(21) Appl. No.: 18/378,414

(22) Filed: Oct. 10, 2023

(65) Prior Publication Data
US 2025/0045162 A1 Feb. 6, 2025

(30) Foreign Application Priority Data

Aug. 2, 2023 (IN) .............................. 202311052018

(51) Int. Cl.
G06F 11/00 (2006.01)
G06F 11/10 (2006.01)
G06F 13/16 (2006.01)

(52) U.S. Cl.
CPC ...... *G06F 11/1092* (2013.01); *G06F 11/1096* (2013.01); *G06F 13/1673* (2013.01)

(58) Field of Classification Search
CPC ............. G06F 11/1092; G06F 11/1096; G06F 13/1673; G06F 11/1076; G06F 13/28
USPC ..................................................... 714/1–57
See application file for complete search history.

(56) References Cited

U.S. PATENT DOCUMENTS

| | | | |
|---|---|---|---|
| 6,993,680 B2* | 1/2006 | Fukumori | G06F 1/30 714/22 |
| 2011/0126045 A1* | 5/2011 | Bennett | G11B 20/1833 714/6.22 |
| 2013/0031420 A1* | 1/2013 | Haverkamp | G06F 11/3656 714/45 |
| 2013/0117603 A1* | 5/2013 | Jess | G06F 11/1088 714/E11.041 |
| 2013/0346793 A1* | 12/2013 | Flynn | G06F 12/0802 714/6.3 |
| 2016/0188424 A1* | 6/2016 | Walls | G06F 11/1662 714/6.3 |
| 2020/0319819 A1* | 10/2020 | Nelogal | G06F 11/1068 |
| 2021/0271547 A1* | 9/2021 | Bates | G11C 16/26 |
| 2024/0176622 A1* | 5/2024 | Ravi | G06F 9/3861 |

OTHER PUBLICATIONS

International Search Report and Written Opinion, Application No. PCT/US2024/014219, 11 pages, May 31, 2024.

* cited by examiner

*Primary Examiner* — Sarai E Butler
(74) *Attorney, Agent, or Firm* — SLAYDEN GRUBERT BEARD PLLC

(57) ABSTRACT

A redundant disk array may include redundant information to facilitate rebuilding the array in the event of a disk failure. A host processor may allocate buffers in an accelerator memory. Data may be moved from one or more storage devices to the buffers. An accelerator engine may perform parity calculations required to rebuild the array based on data in the buffers without requiring a host CPU to perform the parity calculation.

15 Claims, 3 Drawing Sheets

SYSTEM AND METHODS FOR COMPUTING PARITY INFORMATION IN A RAID ARRAY

PRIORITY

This application claims priority to commonly owned Indian patent application No. 202311052018 filed on Aug. 2, 2023, the entire contents of which are hereby incorporated by reference for all purposes.

FIELD OF THE INVENTION

The present disclosure relates to systems and methods for computing parity information in an array of storage devices.

BACKGROUND

In high-density data storage applications, redundant data may be stored to protect against any loss of information. Additionally, a block of data may be written across multiple drives, in what are called strips, and parity information may be stored along with the data. In the event of a failure in one drive, the parity information may be used to recover any lost data.

In one of various examples, a high-density storage application may be implemented as a Redundant Array of Independent Disks (RAID), such as RAID-5 without limitation. In one example of a RAID array, individual drives may be partitioned into strips, and consecutive segments of data may be stored across different storage devices. In one of various examples, M individual drives, numbered 1 to M may, respectively, be partitioned into N strips, the strips numbered from 1 to N. Parity may be computed on a strip-wide basis across each of the M drives. In this example, to compute the parity information for the first strip, a parity calculation may be performed on the data in strip #1 for drives 1 to M−1, and the result stored in drive M.

If a drive fails, the stored parity information may be used to calculate the missing data and prevent any loss of data. However, this calculation of the parity information requires significant computational overhead from the CPU.

There is a need for a system and method to compute parity information in a RAID array that offloads the processing overhead from the CPU.

SUMMARY

The examples herein enable a system and method to compute parity information in a RAID array that offloads the processing overhead from the CPU.

According to one of various aspects, a system may include a central processing unit (CPU), a non-transitory processor memory device coupled to the CPU, one or more storage devices. The one or more storage devices may comprise a storage array and a Direct Memory Access (DMA) circuit. The system may include an accelerator processor, an accelerator non-transitory memory, a shared bus, where the shared bus is coupled to the CPU, the accelerator processor, the accelerator non-transitory memory, and the one or more storage devices. The CPU may instruct the one or more storage devices to move data between the one or more storage devices and the accelerator non-transitory memory. The CPU may instruct the accelerator processor to perform a parity calculation on data stored in the accelerator non-transitory memory and to write the parity information to the one or more storage devices.

According to one of various aspects, a method may include operations of: allocating a source buffer and a result buffer in an accelerator memory in an accelerator device, moving data from one or more storage devices to the source buffer, issuing an interrupt from the one or more storage devices to a host processor, calculating parity information based on data in the source buffer, writing the parity information to the result buffer in the accelerator memory, and writing the parity information to the one or more storage devices.

DETAILED DESCRIPTION

Figure 1:
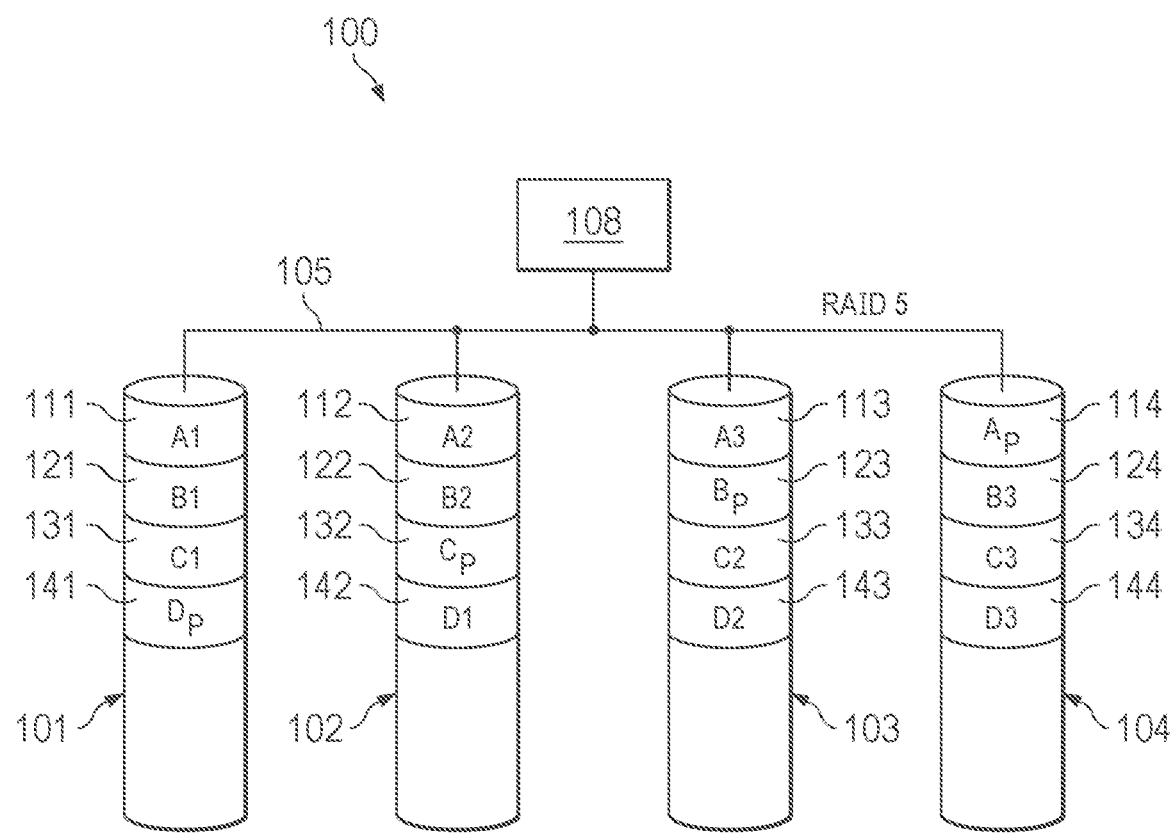
FIG. 1 illustrates one of various examples of a RAID array device.

FIG. 1 illustrates one of various examples of a RAID array device 100. RAID array device 100 may be comprised of four storage devices 101, 102, 103, and 104. RAID array device 100 illustrated in FIG. 1 may be comprised of four storage devices, but this is not intended to be limiting. Other examples may include more than four storage devices or may include fewer than four storage devices.

Storage devices 101, 102, 103 and 104 may, respectively, be non-transitory storage devices, including but not limited to Dynamic Random Access Memory (DRAM), Non-Volatile Memory (NVM), Embedded Non-Volatile Memory (eNVM), Non-Volatile Memory Express (NVMe), or another type of non-transitory storage not specifically mentioned. Storage devices 101, 102, 103 and 104 may, respectively, include a DMA (Direct Memory Access) circuit to move data to and from the storage device.

Storage devices 101, 102, 103 and 104 may, respectively, be coupled to memory bus 105, which may be a Peripheral Component Interconnect Express (PCIe) bus. Memory bus 105 may be coupled to host processor 108. Host processor 108 may be a central processing unit (CPU) or other processing device. Host processor 108 may drive signals onto memory bus 105 to read data from storage devices 101, 102, 103 and 104, and may drive signals onto memory bus 105 to write data to storage devices 101, 102, 103 and 104. Memory bus 105 may be a Peripheral Component Interconnect Express (PCIe) bus, or another bus type not specifically mentioned.

Storage devices 101, 102, 103, and 104 may be divided into strips. Each strip may be a predetermined number of bytes within the storage device. Strips within a storage device may be the same number of bytes, or may be different numbers of bytes. As one of various examples, storage device 101 may be divided into strips 111, 121, 131 and 141, storage device 102 may be divided into strips 112, 122, 132 and 142, storage device 103 may be divided into strips 113, 123, 133 and 143, and storage device 104 may be divided into strips 114, 124, 134 and 144.

In operation, a block of data may be stored across strips in multiple storage devices. In the example illustrated in FIG. 1, a block of data, called block A, may divided into portions A1, A2 and A3. The first portion, A1, may be stored in storage device 101 at strip 111, the second portion, A2, may be stored in storage device 102 at strip 112, and the third portion, A3, may be stored in storage device 103 at strip 113.

At storage device 104, strip 114 may store parity information based on the data stored in strips 111, 112 and 113, the parity information labelled Ap. In one of various examples, the parity information may be computed as a bitwise XOR of the data stored in strips 111, 112 and 113. In other examples, parity information may be computed using a different logical operation or an algorithmic method. Parity information may be computed by host processor 108. In this manner, if any one of the storage devices 101, 102, 103 or 104 may be corrupted or damaged, the corrupted or damaged data may be recovered based on the data in the non-damaged storage devices.

In the example illustrated in FIG. 1, another block of data, block B, may be divided into portions B1, B2 and B3. The first portion, B1, may be stored in storage device 101 at strip 121, the second portion, B2, may be stored in storage device 102 at strip 122, and the third portion, B3, may be stored in storage device 104 at strip 124.

At storage device 103, strip 123 may store parity information based on the data stored in strips 121, 122 and 124, the parity information labelled Bp. In one of various examples, the parity information may be computed as a bitwise XOR of the data stored in strips 121, 122 and 124. In other examples, parity information may be computed using a different logical operation or an algorithmic method. Parity information may be computed by host processor 108. In this manner, if any one of the storage devices 101, 102, 103 or 104 may be corrupted or damaged, the corrupted or damaged data may be recovered based on the data in the non-damaged storage devices.

In the example illustrated in FIG. 1, another block of data, block C, may be divided into portions C1, C2 and C3. The first portion, C1, may be stored in storage device 101 at strip 131, the second portion, C2, may be stored in storage device 103 at strip 133, and the third portion, C3, may be stored in storage device 104 at strip 134.

At storage device 102, strip 132 may store parity information based on the data stored in strips 131, 133 and 134, the parity information labelled Cp. In one of various examples, the parity information may be computed as a logical XOR of the data stored in strips 131, 133 and 134. In other examples, parity information may be computed using a different logical operation or an algorithmic method. Parity information may be computed by host processor 108. In this manner, if any one of the storage devices 101, 102, 103 or 104 may be corrupted or damaged, the corrupted or damaged data may be recovered based on the data in the non-damaged storage devices.

In the example illustrated in FIG. 1, another block of data, block D, may be divided into portions D1, D2 and D3. The first portion, D1, may be stored in storage device 102 at strip 142, the second portion, D2, may be stored in storage device 103 at strip 143, and the third portion, D3, may be stored in storage device 104 at strip 144, the data labelled D3.

At storage device 101, strip 141 may store parity information based on the data stored in strips 142, 143 and 144, the parity information labelled Dp. In one of various examples, the parity information may be computed as a logical XOR of the data stored in strips 142, 143 and 144. In other examples, parity information may be computed using a different logical operation or an algorithmic method. Parity information may be computed by host processor 108. In this manner, if any one of the storage devices 101, 102, 103 or 104 may be corrupted or damaged, the corrupted or damaged data may be recovered based on the data in the non-damaged storage devices.

In the example illustrated in FIG. 1, the parity information is illustrated in specific strips in specific storage devices, but this is not intended to be limiting. Location of parity information may be stored in randomized strips, or may be stored in a deterministic arrangement.

Figure 2:
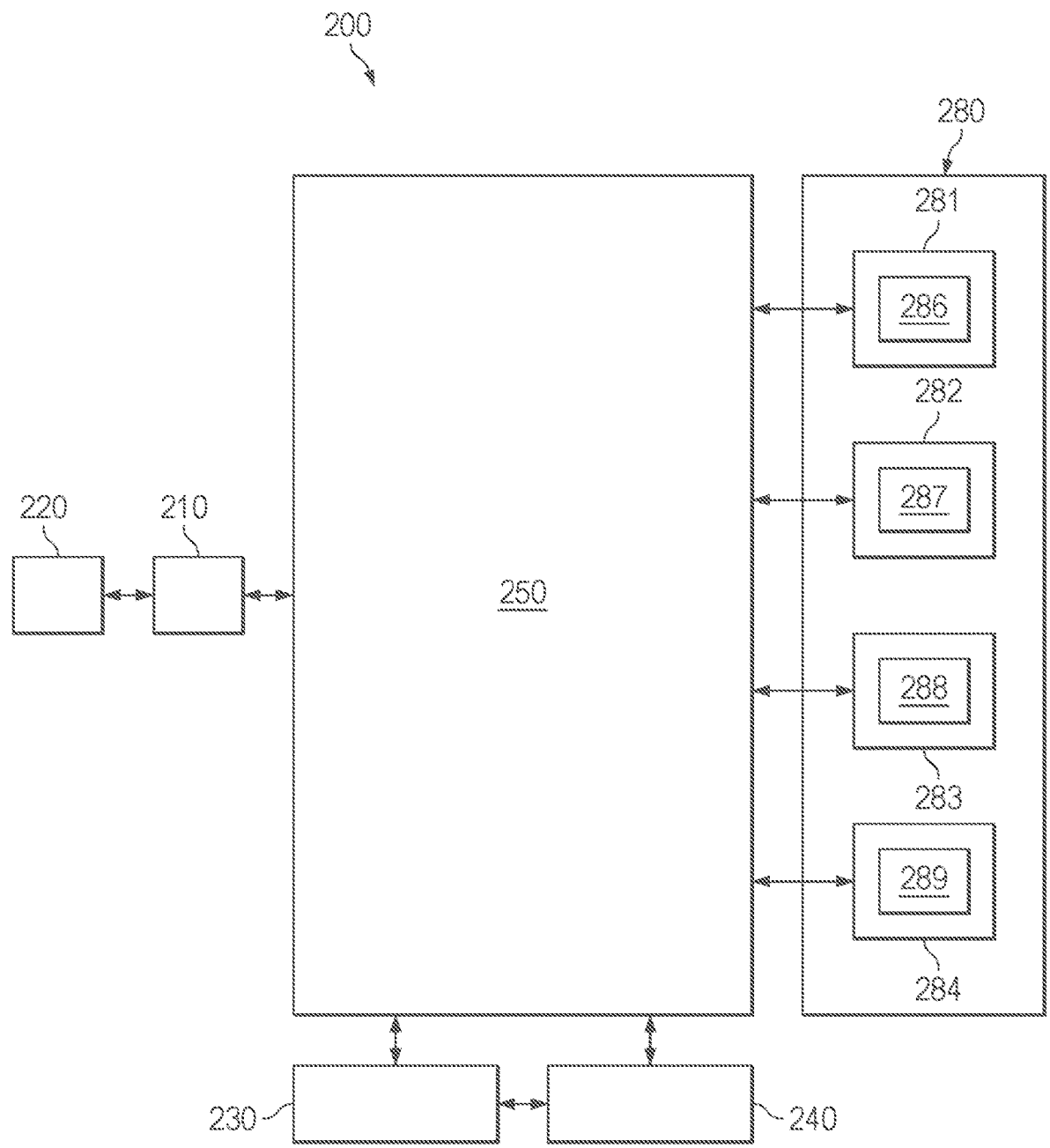
FIG. 2 illustrates one of various examples of a system for computing parity information in a RAID array.

FIG. 2 illustrates one of various examples of a system 200 for computing parity information in a RAID array.

CPU 210 may be coupled to a shared bus 250. Shared bus 250 may receive data from CPU 210 and may transmit data to one or more circuits coupled to shared bus 250. CPU 210 may be coupled to processor memory 220. CPU 210 may write data to processor memory 220 and may read data from processor memory 220. Shared bus 250 may be a PCIe bus, or another type of shared bus not specifically mentioned.

Accelerator memory 230 may be coupled to shared bus 250. Accelerator memory 230 may be a non-transitory memory. Accelerator memory 230 may be dedicated memory hardware, or may be a memory-mapped space allocated in a larger memory device. Shared bus 250 may write data to accelerator memory 230 and may read data from accelerator memory 230. Accelerator processor 240 may receive data from shared bus 250 and may transmit data to shared bus 250. Accelerator memory 230 and accelerator processor 240 may comprise an accelerator device.

Storage device 281 may be a non-transitory storage device, including but not limited to DRAM, NVM, eNVM, NVMe, or another type of non-transitory storage not specifically mentioned. Storage device 281 may be coupled to shared bus 250. Shared bus 250 may facilitate data transmission to and from storage device 281. CPU 210 may move data through shared bus 250 to storage device 281, and CPU 210 may receive data from storage device 281 through shared bus 250. Storage device 281 may include DMA circuit 286. DMA circuit 286 may control data read from storage device 281. Particularly, data read from storage device 281 may be moved to a destination address provided with a read instruction received by storage device 281. CPU 210 may move data through shared bus 250 to storage device 281, and CPU 210 may receive data from storage device 281 through shared bus 250. Storage device 281 may be partitioned into strips, as illustrated and described in reference to FIG. 1.

Storage device 281 may include DMA circuit 286. CPU 210 may send a command to storage device 281, the command to instruct DMA circuit 286 to read data from storage device 281 or to write data to storage device 281. Based on the address sent in the command, data may be written to or read from processor memory 220 or accelerator memory 230.

Storage device 282 may be a non-transitory storage device, including but not limited to DRAM, NVM, eNVM, NVMe, or another type of non-transitory storage not specifically mentioned. Storage device 282 may be coupled to shared bus 250. Shared bus 250 may facilitate data transmission to and from storage device 282. CPU 210 may move data through shared bus 250 to storage device 282, and CPU 210 may receive data from storage device 282 through shared bus 250. Storage device 282 may be partitioned into strips, as illustrated and described in reference to FIG. 1.

Storage device 282 may include DMA circuit 287. CPU 210 may send a command to storage device 282, the command to instruct DMA circuit 287 to read data from storage device 282 or write data to storage device 282.

Based on the address sent in the command, data may be written to or read from processor memory 220 or accelerator memory 230.

Storage device 283 may be a non-transitory storage device, including but not limited to DRAM, NVM, eNVM, NVMe, or another type of non-transitory storage not specifically mentioned. Storage device 283 may be coupled to shared bus 250. Shared bus 250 may facilitate data transmission to and from storage device 283. CPU 210 may move data through shared bus 250 to storage device 283, and CPU 210 may receive data from storage device 283 through shared bus 250. Storage device 283 may be partitioned into strips, as illustrated and described in reference to FIG. 1.

Storage device 283 may include DMA circuit 288. CPU 210 may send a command to storage device 283, the command to instruct DMA circuit 288 to read data from storage device 283 or write data to storage device 283. Based on the address sent in the command, data may be written to or read from processor memory 220 or accelerator memory 230.

Storage device 284 may be a non-transitory storage device, including but not limited to DRAM, NVM, eNVM, NVMe, or another type of non-transitory storage not specifically mentioned. Storage device 284 may be coupled to shared bus 250. Shared bus 250 may facilitate data transmission to and from storage device 284. CPU 210 may move data through shared bus 250 to storage device 284, and CPU 210 may receive data from storage device 284 through shared bus 250. Storage device 284 may be partitioned into strips, as illustrated and described in reference to FIG. 1.

Storage device 284 may include DMA circuit 289. CPU 210 may send a command to storage device 284, the command to instruct DMA circuit 289 to read data from storage device 284 or write data to storage device 284. Based on the address sent in the command, data may be written to or read from processor memory 220 or accelerator memory 230.

Storage devices 281, 282, 283 and 284 may form a RAID array 280. The example illustrated in FIG. 2 may form a RAID-5 array, but this is not intended to be limiting. Storage elements 281, 282, 283 and 284 may comprise a different type of storage array.

In operation, system 200 may compute parity information in RAID array 280 and may rebuild damaged storage devices within RAID array 280. Data may be read from one or more of storage devices 281, 282, 283 and 284, and may be stored in a source buffer space in accelerator memory 230 based on an address provided in the read instruction issued by CPU 210 as part of a rebuild routine. The source buffer space may be a memory-mapped portion of a memory device, or may be a dedicated memory circuit. DMA circuit 286 may move data from storage device 281 to a predetermined source buffer location in accelerator memory 230. DMA circuit 287 may move data from storage device 282 to a predetermined source buffer location in accelerator memory 230. DMA circuit 288 may move data from storage devices 283 to a predetermined source buffer location in accelerator memory 230. DMA circuit 289 may move data from storage devices 284 to a predetermined source buffer location in accelerator memory 230, which predetermined source buffer location is defined in the read instruction provided by CPU 210. In this manner, CPU 210 and processor memory 220 may store data from one or more storage devices 281, 282, 283 and 284 for the rebuild routine. CPU 210 resources may be reserved for other operations. Data read from the one or more storage devices 281, 282, 283 and 284 may comprise one or more strips of storage devices 281, 282, 283 and 284.

At the completion of the data move of the read data from one or more storage devices 281, 282, 283 and 284, an interrupt may be issued to CPU 210 by the respective ones of one or more storage devices 281, 282, 283 and 284. CPU 210 may issue a command to accelerator processor 240 over shared bus 250, the command instructing accelerator processor 240 to perform a parity calculation on the data stored at the location in accelerator memory 230 where the read data moved from the one or more storage devices 281, 282, 283 and 284 has been stored. Accelerator processor 240 may access data in accelerator memory 230 directly, without requiring any commands or control from CPU 210. After the parity information is calculated, the parity information may be stored in a results buffer in accelerator memory 230. The results buffer may be a memory-mapped space, or may be a dedicated memory circuit. At the completion of the parity calculation, the parity information stored in accelerator memory 230 may be written to one of storage devices 281, 282, 283 and 284 by one of DMA circuits 286, 287, 288 and 289. In this manner, parity information may be computed for a RAID array without using CPU 210 to move data between storage devices 281, 282, 283, 284 and accelerator memory 230.

Figure 3:
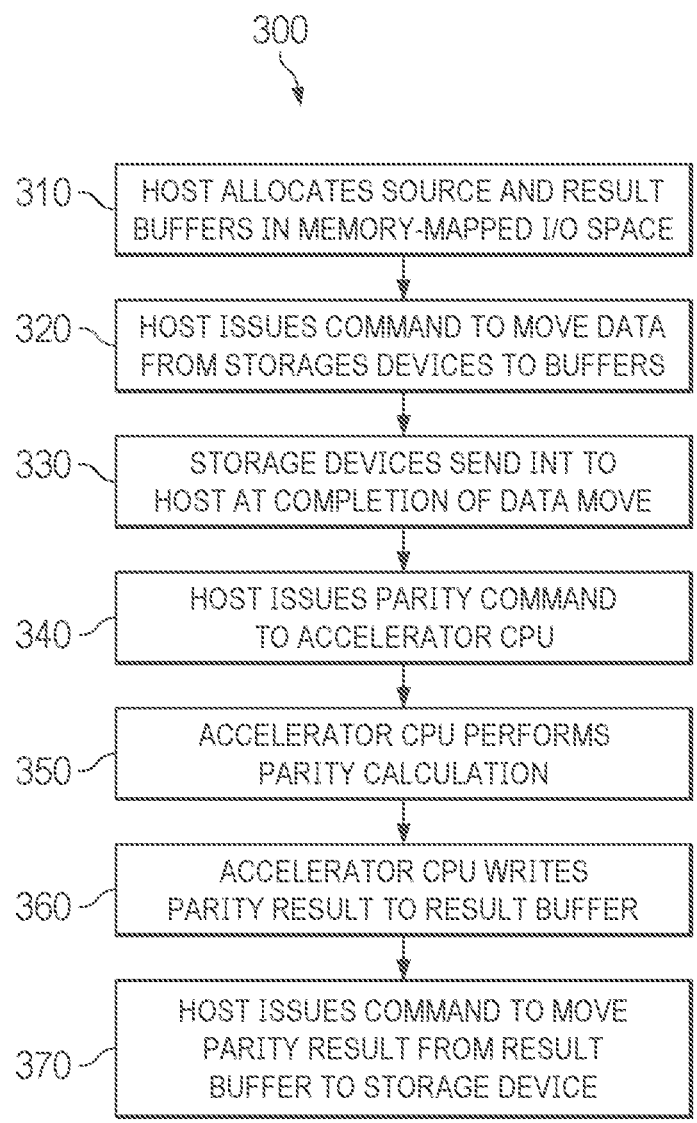
FIG. 3 illustrates a method for computing parity information in a RAID array.

FIG. 3 illustrates a method 300 for computing parity information in a RAID array, which may utilize system 200.

At operation 310, a host processor may allocate source and result buffers in the host memory-mapped space belonging to the accelerator device. The host processor may be a CPU or other processor device. The buffers in the accelerator memory may be memory mapped input/output space. The host processor may be connected to the accelerator memory over a PCIe bus or another shared bus architecture not specifically mentioned.

At operation 320, the host processor may issue a command to read data from one or more storage devices to the source buffers. The movement of data may be performed by a DMA circuit in the respective storage devices.

At operation 330, the one or more storage devices may send an interrupt to the host processor at the completion of the data move. At operation 340, the host processor may issue a command instructing the accelerator processor to compute parity information on the data stored in the source buffers.

At operation 350, the accelerator processor may perform the parity calculation on the data in the source buffers. In one of various examples the parity information is computed by an exclusive OR (XOR) bit by bit of the data moved to the source buffers. At operation 360, the accelerator processor may write the parity result to the result buffer.

At operation 370, the host may issue a command to move the parity result from the result buffer to one or more storage devices.

The invention claimed is:

1. A system comprising:
   a central processing unit (CPU);
   a non-transitory processor memory device coupled to the CPU;
   one or more storage devices, the one or more storage devices comprising a storage array and a Direct Memory Access (DMA) circuit;
   an accelerator processor;
   an accelerator non-transitory memory;
   a shared bus, shared bus coupled to the CPU, the accelerator processor, the accelerator non-transitory memory, and the one or more storage devices, and wherein the CPU to instruct the one or more storage devices to move data between the one or more storage devices and the accelerator non-transitory memory, and wherein the CPU to instruct the accelerator processor to perform a parity calculation on data stored in the accelerator non-transitory memory and to write a result of the parity calculation to the one or more storage devices.

2. The system as claimed in claim 1, the one or more storage devices partitioned into one or more strips, respective strips comprised of a predetermined number of bytes.

3. The system as claimed in claim 2, the strips comprised of portions of blocks of data.

4. The system as claimed in claim 2, the strips comprised of parity information.

5. The system as claimed in claim 1, the accelerator non-transitory memory comprising a source buffer and a result buffer.

6. The system as claimed in claim 5, the CPU to instruct the DMA circuit in one or more storage devices to move data between the one or more storage devices and the source buffer within the accelerator non-transitory memory.

7. The system as claimed in claim 5, the CPU to instruct the accelerator processor to write a result of the parity calculation to the result buffer within the accelerator non-transitory memory.

8. The system as claimed in claim 1, the system to rebuild the storage array based on data stored in the one or more storage devices.

9. A method comprising:
allocating a source buffer and a result buffer in an accelerator memory in an accelerator device, the accelerator device external to one or more storage devices;
moving data from the one or more storage devices to the source buffer;
issuing an interrupt from the one or more storage devices to a host processor;
calculating parity information based on data in the source buffer;
writing the parity information to the result buffer in the accelerator memory, and
writing the parity information to the one or more storage devices.

10. The method as claimed in claim 9, the one or more storage devices partitioned into one or more strips, each strip comprised of a predetermined number of bytes.

11. The method as claimed in claim 10, the strips comprised of portions of blocks of data.

12. The method as claimed in claim 10, the strips comprised of parity information.

13. The method as claimed in claim 9, the moving data from one or more storage devices to the source buffer to be performed by a respective DMA circuit of the one or more storage devices.

14. The method as claimed in claim 9, the writing the parity information to the one or more storage devices to be performed by a respective DMA circuit of the one or more storage devices.

15. The method as claimed in claim 9, the calculating parity information based on data in the source buffer to be performed by an accelerator processor.

* * * * *